United States Patent [19]

Geen et al.

[11] 4,001,110
[45] Jan. 4, 1977

[54] METHOD FOR THE THERMAL TREATMENT OF TUBULAR DIALYSIS UNITS AND IMPROVED UNITS RESULTING THEREFROM

[75] Inventors: Henry C. Geen, Brooklyn; Clarence S. Vinton; Charles H. Franklin, both of Ann Arbor, all of Mich.

[73] Assignee: Chemotronics International, Inc., Ann Arbor, Mich.

[22] Filed: Apr. 17, 1975

[21] Appl. No.: 569,020

[52] U.S. Cl. .............................. 210/22 A; 210/79; 210/321 B
[51] Int. Cl.² ......................................... B01D 31/00
[58] Field of Search ............ 210/22, 321 R, 321 A, 210/321 B, 79; 264/48, 80, 321

[56] References Cited

UNITED STATES PATENTS

| | | | |
|---|---|---|---|
| 3,175,025 | 3/1965 | Geen et al. | 264/321 X |
| 3,175,030 | 3/1965 | Geen | 264/321 |
| 3,228,876 | 1/1966 | Mahon | 210/321 K X |
| 3,456,047 | 7/1969 | Vinton et al. | 264/80 |
| 3,698,560 | 10/1972 | Tapp et al. | 210/321 K |
| 3,708,071 | 1/1973 | Crowley | 210/321 K |
| 3,767,502 | 10/1973 | Ishii et al. | 210/321 R X |
| 3,773,181 | 11/1973 | Calderwood et al. | 210/321 R |

*Primary Examiner*—Charles N. Hart
*Assistant Examiner*—Robert H. Spitzer
*Attorney, Agent, or Firm*—Ian C. McLeod

[57] ABSTRACT

A method for rounding sharp edged tube lips and for cleaning of dialysis units, such as artificial kidneys, of the type where multiple tube ends are sealed in place at end surfaces to be cleaned in the unit, is described. The method involves the transient thermal treatment of the tube lips and the end surfaces adjacent the lips of the unit while the inside of each of the tubes is filled with a noncombustible fluid which shields the tubes from the thermal treatment. The resulting heat-polished rounded tube lips in the unit provide improved dialyzate fluid flow. In artificial kidneys, damage to cells in blood being dialyzed is reduced and reduction of particulate matter introduced into the blood is accomplished.

12 Claims, 8 Drawing Figures

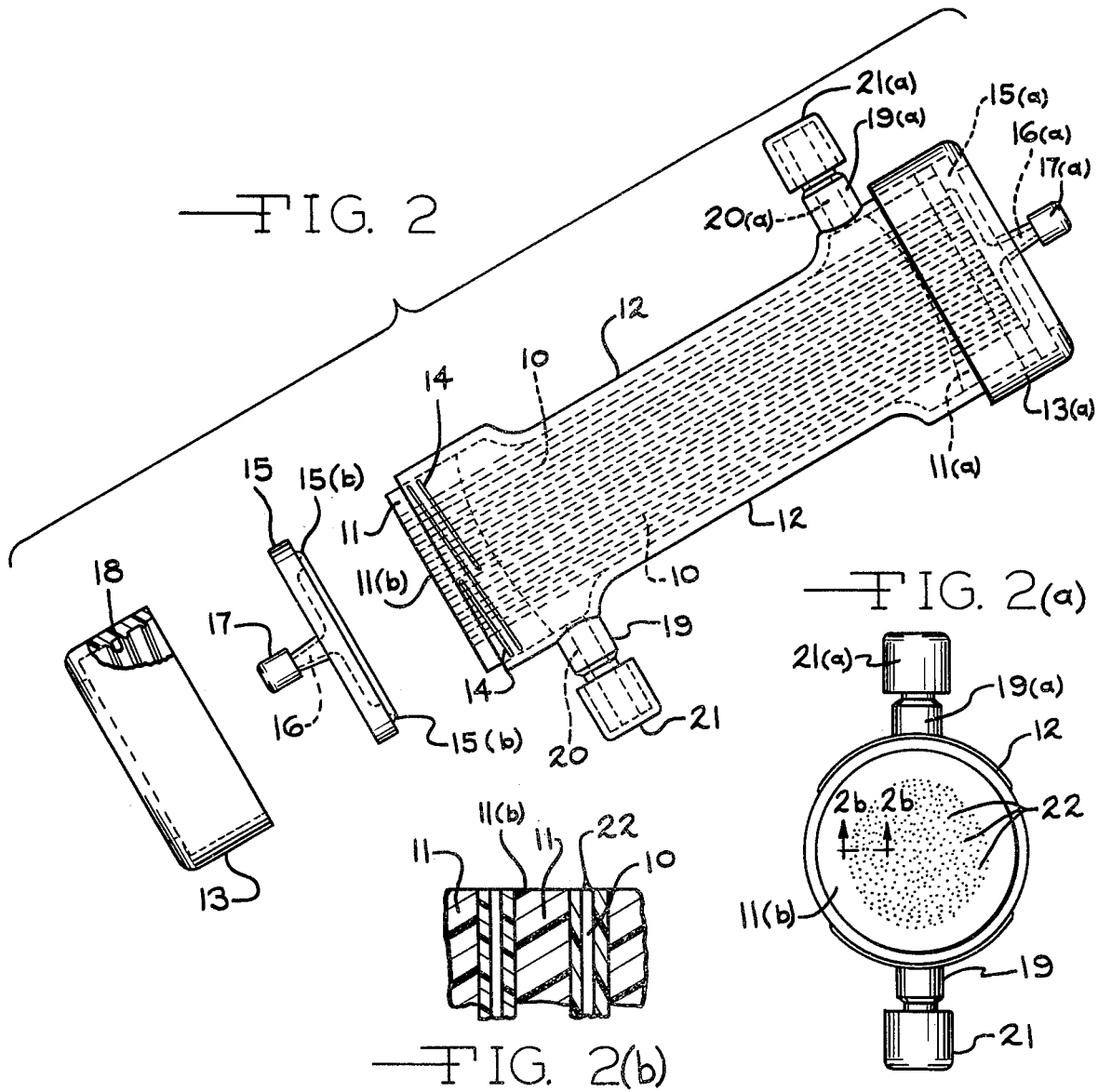

METHOD FOR THE THERMAL TREATMENT OF TUBULAR DIALYSIS UNITS AND IMPROVED UNITS RESULTING THEREFROM

SUMMARY OF THE INVENTION

The present invention relates to improved tubular dialysis units and to a method for their preparation. In particular, the units have improved fluid flow characteristics because of the rounding of the tube lips and improved cleanliness when produced by the method of the present invention.

PRIOR ART

The use of dialysis units for human blood cleansing, which are usually referred to as artificial kidneys, has become extensive in recent years. In these units the blood or dialyzate is positioned on one side of a thin walled semi-permeable membrane and the dialysis fluid is in contact with the other side of the membrane. The impurities, such as urea and uric acid, are removed through the membrane. Such units are described for instance in Chemical and Engineering News, July 15, 1974, at pages 22 and 23.

One of the more widely used units, which has a bundle of hollow fiber semi-permeable membrane tubes provided inside a shell, is manufactured by Cordis Laboratories. In this unit the multiple tube ends are sealed in place in the shell in a manner which provides annular sharp edged tube lips at both ends of the tubes. The sharp lips result from cutting of the tubes after the outsides of the tube ends have been encapsulated and sealed by a polyurethane resin in the shell. The cutting provides flat end surfaces at both ends of the tube bundle so that covers can be fitted to seal the ends of the unit for inlet and outlet of the blood. A problem with this prior art unit is that the sharp lips on the tubes resulting from the cutting interferes with dialzate fluid flow and the cutting creates particles of the materials being cut which are difficult to remove. Most importantly, in artificial kidneys the sharp edged lips damage red blood cells upon entry into or exit from the tubes and particulate matter introduced into the user's bloodstream can cause serious health problems.

It is therefore an object of the present invention to provide a method for rounding the sharp edged lips of the dialysis tubes to make them less likely to damage blood cells and to clean the ends of the dialysis unit which come in contact with the user's blood. It is further an object to improve the fluid flow into and from such tubes due to the rounding of the lips. Further still it is an object of the present invention to provide a method whereby the cleaning operation is conducted and the sharp edged tubes are rounded in a manner which does not rupture or otherwise damage the thin walled membranes of the tubes. These and other objects will become increasingly apparent by reference to the following description and to the drawings.

IN THE DRAWING

FIG. 1 is a schematic diagram illustrating the basic method steps in the thermal treatment of the present invention.

FIG. 2 is a front view of an artificial kidney with one end cap and cover removed. FIG. 2(a) is an end view of the artificial kidney shown in FIG. 2 illustrating the encapsulated tube ends. FIG. 2(b) is a partial enlarged cross-sectional view of the tube ends shown in FIG. 2(a) illustrating the sharp edged lips of the prior art units.

DETAILED DESCRIPTION

The present invention particularly relates to the method for cleaning of, and improving dialyzate fluid flow characeristics in, a tubular dialysis unit of the type where multiple tube ends are sealed in place in a manner which provides sharp edged tube lips at end surfaces of the unit to be cleaned which comprises: providing a noncombustible fluid inside the tubes and transiently providing a heated gas in contact with the lips so as to round the lips and clean the end surfaces of the unit without damaging the tubes. Steps 1 and 2 of the method as it is broadly defined are shown in FIG. 1.

A particularly preferred method for cleaning and improving dialyzate fluid flow characteristics in such tubular dialysis units comprises: providing a noncombustible fluid inside the tubes; providing a gas which transiently releases thermal energy upon initiation in contact with the lips without removing the noncombustible fluid from inside the tubes; and initiating the transient thermal energy release in the gas to round the lips of the tubes and clean the end surfaces of the unit without rupture of the tubes.

Figure 3A:
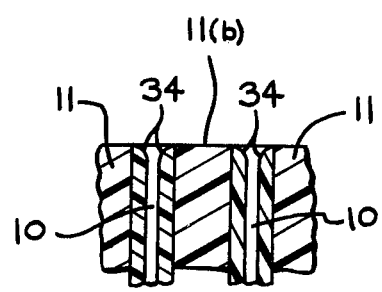
FIG. 3(a) is a cross-sectional enlarged view of individual tube ends after the thermal treatment of the present invention wherein the annular sharp edged lips are rounded.

The present invention also relates to the resulting improved dialysis units having multiple dialyzate fluid flow-through tubes provided inside a shell having means for dialysis fluid entry and exit with the ends of the tubes sealed in place in the shell in a manner which provides sharp edged tube lips at end surfaces of the unit which require cleaning to remove particulate matter which comprise at least one heat-polished rounded lip on each tube at end surfaces which are substantially free of particulate matter, the tubes being free from leaks in the walls and having improved flow-through characteristics at each rounded lip. The rounded lips are shown in FIG. 3(a) and are discussed more fully hereinafter. The phrase "substantially free from particulate matter" means that for practical purposes loose particles of matter on the flat surfaces are eliminated.

In the prior art artificial kidneys illustrated in FIGS. 2, 2(a) and 2(b), hollow dialysis tubes 10 (which can be about 0.25 mm inside diameter) are provided inside a shell 12 which is usually composed of a transparent plastic as a visual aid. The ends of the tubes 10 are sealed in place at the ends of the shell 12 by a resin 11 and 11(a) which encapsulates the outside surfaces of the ends of the tubes 10 to provide flat end surfaces 11(b) as particularly illustrated in FIGS. 2(a) and 2(b). The opposing ends of the shell 12, which are identical, are fitted with caps 13 and 13(a) which hold covers 15 and 15(a) in place. The covers 15 and 15(a) are provided with a seal 15(b) with the flat face 11(b) of the resin 11. The caps 13 and 13(a) are joined to the shell by means of threads 18 corresponding to threads 14 on the shell 12. The covers 15 and 15(a) are provided with conduits 16 and 16(a) having removable stoppers 17 and 17(a). The shell 12 is fitted with an inlet and an outlet 19 and 19(a) having conduits 20 and 20(a). Stoppers 21 and 21(a) are provided on inlet and outlet 19 and 19(a) which are removable for use of the unit.

In the use of the unit to dialyze blood, the stoppers 17 and 17(a) are removed and blood is introduced into the conduit 16, through the tubes 10 and then out of the conduit 16(a). The dialysis fluid is introduced into and exits from the shell 12 through conduit 20 and conduit 20(a) after dialyzing the blood.

In the production of artificial kidneys the tubes 10 are sealed in place inside the shell 12 by the resin 11 and 11(a). In order to provide a relatively smooth flat surface 11(b), the tubes 10 are then cut along with the resin 11 and 11(a). This cutting produces the sharp edged lips 22 on the tubes 10, as shown particularly in FIG. 2(b), and particulate matter on the ends of the artificial kidney. It is this lip 22 which damages blood cells as they pass into or exit from the artificial kidney. In the method of the present invention, a novel thermal treatment is used to round the sharp edged lips 22 of the tubes 10 and to clean off the particulate matter.

Thermal treatments have been described in the prior art, for instance in U.S. Pat. Nos. 3,175,025 and in 3,475,229, for use in connection with cellular materials and in deburring fabricated articles as well as in rounding sharp edges. U.S. Pat. No. 3,456,047 describes the thermal treatment of cellular materials where in void spaces surrounding the outside materials are provided with a noncombustible material blanket to prevent damage to the cellular material. None of these patents recognized that very thin walled semi-permeable membranes could be transiently thermally treated without damage. It would be anticipated by one skilled in the art that pressure waves from the ignition of a combustible gas would damage the tubes 10. When the tubular dialysis units were treated according to the teachings of the above patents the tubes were ruptured and the units rendered unfit for use.

It was found that a noncombustible fluid had to be provided inside the tubes to prevent damage to the tubes. These are the steps of the method of the present invention as are described in detal hereinafter in relation to FIGS. 3 and 3(a).

Figure 3:
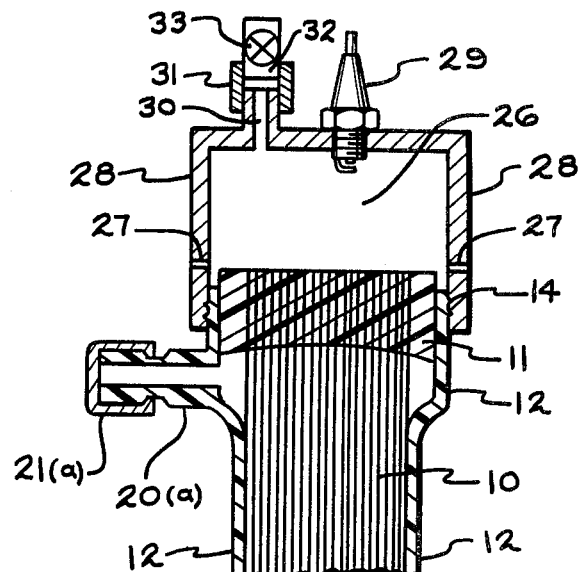
FIG. 3 is a cross-sectional view of the artificial kidney of FIG. 2 prepared for treatment wherein one end of the shell as shown in FIG. 2(a) is fitted with a gas holding means for providing a thermal energy releasing gas adjacent to sharp edged tube lips of FIG. 2(b).

FIG. 3 illustrates a preferred apparatus used in the method of the present invention. In the preferred first step of the method, the noncombustible gas is provided inside the tubes 10, the lips 22 of which are to be rounded. At one end of the shell 12, the cap 13(a) holds the cover 15(a) with conduit 16(a). Fitted onto conduit 16(a) by a coupling 23 is a non-combustible gas inlet tube 24 with a control valve 25.

At the end of the shell 12 opposite inlet tube 24, a gas holding means 28 providing a chamber 26 with vent holes 27 open to the atmosphere about 0.32 cm in diameter, 25 in number spaced equidistant apart having a combined area of 2.0 sq. cm. around a 6.47 centimeters diameter gas holding means which has a volume of about 314 cubic centimeters is threaded onto the shell 12. A fuel inlet conduit 30 is provided at the top of the holding means 28 which leads into the chamber 26. The conduit 30 is supplied by conduit 32 with a thermal energy releasing gas and is openable and closable by means of a valve 33. A coupling 31 joins the fuel inlet conduit 30 and supply conduit 32. A spark plug 29 is mounted on the top of the holding means 28.

A noncombustible gas is introduced into the tubes 10 by opening the valve 25. The noncombustible gas is provided from a suitable reservoir (not shown) through tube 24 and passes through conduit 16(a), moves inside the tubes 10, up into the chamber 26 of gas holding means 28 and then out through the vent holes 27 to the atmosphere or to a discharge conduit (not shown) which is open to the atmosphere. When the tubes 10 are filled the valve 25 is closed. Preferably the noncombustible gas is carbon dioxide.

In the second step, the thermal energy releasing gas is supplied to the chamber 26 through the inlet 30 from a reservoir (not shown) by opening valve 33. The thermal energy releasing gas is slowly flowed into the chamber 26 so as not to "wash out" substantial amounts of the non-combustible gas from inside the tubes 10. Noncombustible gas and excess combustible gas are expelled through vent holes 27. Valve 33 is then closed. Preferably the gas is a 3 to 1 by volume mixture of hydrogen and oxygen and the chamber 26 is flushed for a short period of time, between about 0.1 and 10 seconds, with the combustible gas mixture.

In the third step, the combustible gas in the chamber 26 is ignited by the spark plug 29. Conventional electrical discharge equipment (not shown) can be used to cause the discharge of the plug 29. Upon ignition of the combustible gas, gas pressure is released through vent holes 27 and the lips 34 are rounded and the end of the unit is cleaned. The process is then repeated at the opposing end of the shell 12 so that all of the tube lips 34 are rounded and both ends are cleaned. Alternatively, both ends can be treated simultaneously by using gas holding means 28 at both ends (not shown).

As a result of the treatment, the lips 34 of the tubes 10 are rounded as shown in FIG. 3(a) in enlarged cross-seciton. This result is unexpected because relatively prolonged flame treatment of the tube ends by application of a burner flame to the encapsulated and cut ends of the tubes does not result in rounding the tube lips 22 before damage to the encapsulating resin or tubes occurs. It has been found that the rounding of the lips 34 and cleaning of the end 11(b) is sufficient as a result of one treatment to significantly reduce damage to blood cells passing through the tubes 10 and that the flat end surface 11(b) is cleaned of particulate matter which have been significant prior art problems.

Figure 4:
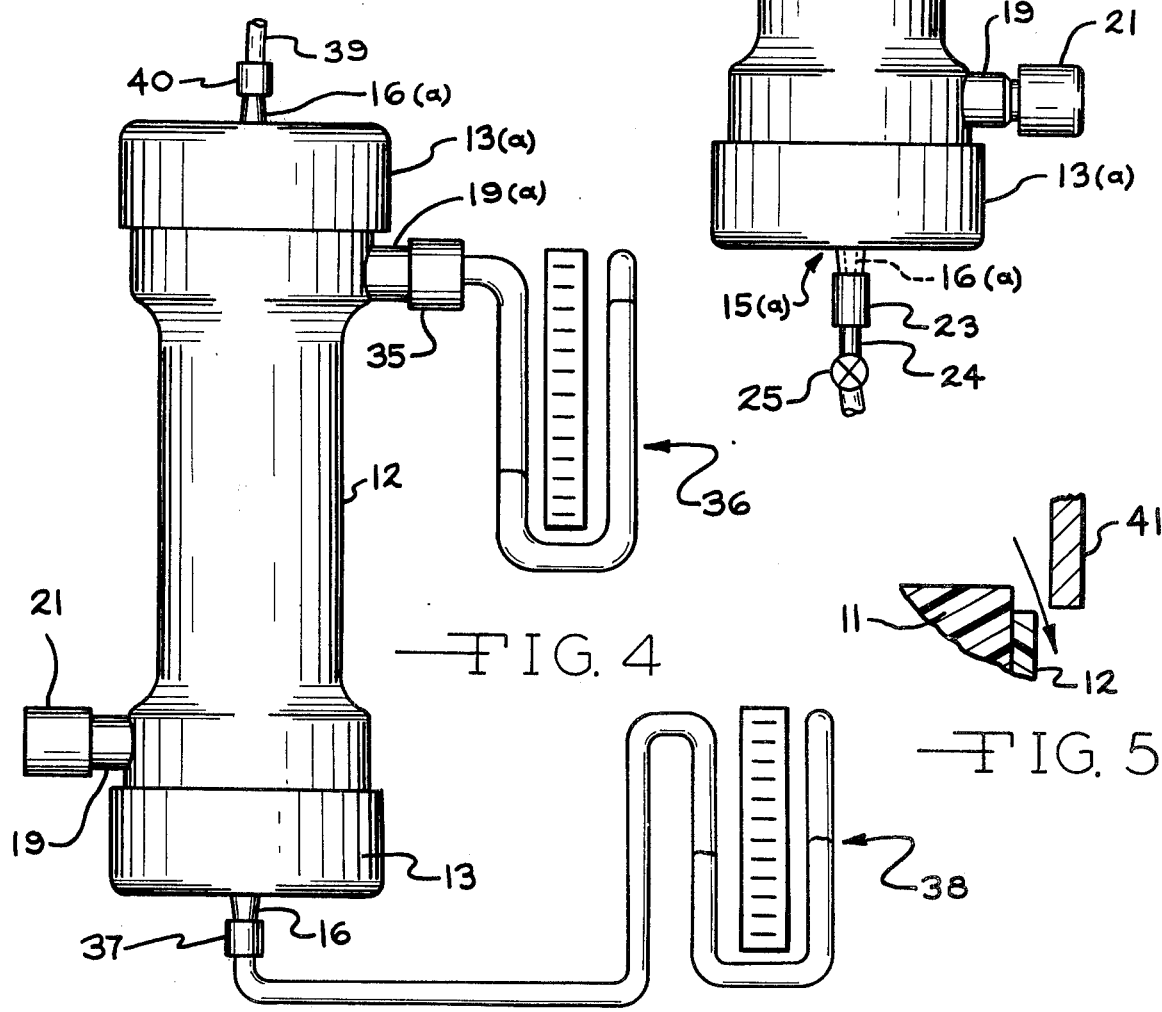
FIG. 4 is a front view of the artificial kidney illustrating one preferred method for verifying the non-rupture of the rounded lip tubes as a result of the thermal treatment which uses a pressure differential between the shell and the inside of the dialysis tubes.

After the rounding of the lips 34 and the cleaning of the end 11(b) has been completed, it is important to verify that the tubes 10 have not been ruptured. This is readily accomplished by providing a pressure differential between the inside and the outside of the tubes 10. As shown in FIG. 4, a first manometer tube 36 is provided with a coupling 35 to the dialyzate fluid shell 12, conduit 20 or 20(a) and a second manometer 38 is provided with a coupling 37 at one end plate conduit 16. The pressure is reduced by a vacuum pump (not shown) via conduit 39 connected by coupling 40 and to conduit 16(a). If there is no leakage the manometer 36 will remain unchanged, while manometer 38 will register the vacuum. If there is a leak between the inside of the tubes and the shell, manometer 36 will also measure the reduced pressure. For artificial kidneys or other dialysis units such verification is very important to prevent subsequent dialyzate leakage into the dialysis fluid in use.

Figure 5:
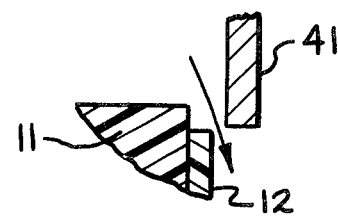
FIG. 5 is a front cross-sectional partial section illustrating a modified gas holding means which can be used in place of the gas holding means shown in FIG. 3.

It will be appreciated that other means for venting of the non-combustible gas, combustible gas and combustion products can be used. The gas holding means 28 with vent holes 27 can be replaced with a cap-like gas holding means 41 which is open at the sides between and around the circumference of the shell 12 and the holding means 41 as shown in FIG. 5. Thus the positions of the shell 12 and such gas holding means 41 are fixed relative to each other. In the preferred apparatus of FIG. 5 the flat surface 11(b) diameter is 6.29 cm and the inside of the gas holding means 41 is 6.67 cm in diameter and has a volume of about 284 cc. In this apparatus, the flat end surface 11(b) was about 0.16 cm into the opening in the holding means 41. There are numerous obvious variations for venting the gas holding means. Preferably the vent openings are adjacent the surface being treated so that the ignition products tend to clean and heat-polish the surface as they pass out the vent openings.

The noncombustible fluid can be a liquid although a gas is preferred since it is a dry system requiring no subsequent cleanup or removal prior to subsequent handling. Liquids such as water can be used. Where a liquid is provided inside the tubes 10 and the shell 12 greater pressure rises can be used, such as produced by the adiabatic compression of a gas or by use of superatmospheric combustible gas pressures in a sealed chamber.

The noncombustible gas can be selected from various relatively stable gaseous materials described hereinafter, such as the relatively inactive gases such as nitrogen, carbon dioxide and the monatomic gases such as helium, argon and the like. Carbon dioxide is preferred because of its low cost, ready availability, density and viscosity. It is usually desirable to use a noncombustible gas having a density different than the density of the combustible gaseous mixture to make use of the buoyancy effect. The phrase "noncombustible gas" as used herein means gases or mixtures of gases which are not combustible per se or in combination and which are sufficiently stable chemically to be essentially unaffected by the combustion or decomposition of a thermal energy releasing gas at the lips of the tubes and which therefore do not contribute energy to the exothermic reaction occurring in the chamber upon initiating the combustion or decomposition.

A heated gas can be used to round the lips of the tube. The gas can be heated by means of a shock wave or by adiabatic compression. While these alternatives can be used, it is simpler to clean the ends and round and heat-polish the lips by initiating a transient thermal energy released by combustion of a gas adjacent the lips. In this way all of the tube ends are substantially uniformly rounded. Preferably the gas is a very rapidly combustible mixture such as hydrogen and oxygen. The energy released, which is usually over a period of less than one second, is self-limiting and thus the risk of thermal injury to the tube lips is greatly reduced.

The transient thermal energy producing gases can be for instance decomposable gases such as acetylene along or preferably combustible mixtures of oxidizable gases and oxidizer gases. Hydrogen or natural gas are preferred oxidizable materials because of the superior results obtained and because of low cost and ease of availability. Lower alkanes containing 1 to 4 carbon atoms, individually or in mixture as gases, can be used with good results. Other oxidizable gases which can be used are for instance, ammonia, hydrazine, hydrogen sulfide, carbon monoxide and various hydrocarbons such as acetylene, MAPP, ethylene oxide and ethylene. Suitable gaseous oxidizers are pure oxygen which is preferred, oxygen with gaseous diluents such as air, halogens such as fluorine and chlorine and suitable decomposable gases are acetylene and various gaseous nitrogen containing materials which can act as oxidizers or can be decomposed per se with the rapid or transient release of thermal energy. Care must be taken to make sure the combustion products are carefully removed and that they do not contaminate the unit in any way which adversely affects the end use (e.g. as an artificial kidney).

In general, it is preferred to use a molar excess of oxidizable gas to insure complete reaction of the oxidizer gas and to prevent substantial oxidization of the surfaces of the tubes; although in some instances it is desirable to have an excess of oxidizer so that the surfaces of the tubes may be oxidized or so that the tubes may contribute to the energy of the system by acting as a secondary oxidizable material.

The combustible or decomposable gases might be provided in a sealed chamber at elevated pressures in order to provide a more energetic reaction although the tubes which are relatively thin walled are much more prone to rupture and thus this method is not preferred. Where this is done the fluid should be a relatively incompressible and essentially inert liquid which is provided inside the tubes 10 and the shell 12 to provide a greater protective effect. Where desired, the combustible or decomposable gases can be generated and provided by heating various liquid or solid materials to the gaseous state and/or by heating the system. However, these procedures are not preferred because of the added expense involved and risk of damage to the dialyzer unit.

Various initiating means can be used to initiate a reaction in the combustible or decomposable gases to produce the transient thermal energy release. Thus, spark or glow devices such as spark or glow plugs are preferred for ignition of a combustible gas material and ultraviolet radiation or shock waves are preferred for initiating a reaction in a decomposable gas. All of these variations will be obvious to one skilled in the art.

Various methods can be used to verify that the dialyzer tubes have not been ruptured by the thermal treatment. A simple and economical method is the use of a gas pressure differential between the inside and the outside of the tubes. However, other positive methods can be used to detect leakage.

Preferably the tubes to be rounded are composed of a cellulose triacetate resin. However, as will be appreciated, tubes composed of cuprammonium rayon and of a polysulfone resin are in use and can be thermally treated by the method of the present invention. Essentially tubes composed of any thermoplastic resin and having any desired cross-section can be so treated.

We claim:

1. The method for cleaning and improving dialyzate fluid flow characteristics in a tubular dialysis unit of the type where multiple tube ends are sealed in place in a manner which provides sharp edged tube lips at end surfaces of the unit to be cleaned which comprises:
    a. providing a noncombustible fluid inside the tubes;
    b. providing a gas which transiently releases thermal energy upon initiation in contact with the lips without removing the noncombustible fluid from inside the tubes; and c. initiating the transient thermal energy release in the gas to round the lips of the tubes without rupture of the tubes and to clean the end surfaces of the unit.

2. The method for cleaning and improving dialyzate fluid flow characteristics in a tubular dialysis unit of the type where multiple tube ends are sealed in place in a manner which provides sharp edged tube lips at end surfaces of the unit to be cleaned which comprises:

a. providing a noncombustible fluid inside the tubes;
b. providing a gas which transiently releases thermal energy upon initiation in contact with the lips without removing the noncombustible fluid from inside the tubes; and
c. initiating the transient thermal release in the gas to round the lips of the tubes without rupture of the tubes; and
d. verifying the integrity of the tubes.

3. The method for cleaning and improving dialyzate fluid flow characteristics in a tubular dialysis unit of the type where multiple tube ends are sealed in place in a manner which provides sharp edged tube lips at flat end surfaces of the unit to be cleaned which comprises:

a. providing thin walled dialysis tubes which are sealed inside an outer shell having means for dialyzing fluid entry and exit;
b. providing gas holding means mounted on or adjacent to the shell outside of and surrounding the lips of the dialysis tubes at the dialyzate fluid tube entry and exit ends of the shell for maintaining a combustible gas in contact with the lips;
c. introducing a noncombustible gas inside the tubes;
d. introducing a combustible gas into the holding means and in contact with the lips without removing substantial amounts of the noncombustible gas from inside of the tubes; and
e. igniting the combustible gas in the holding means to round the lips of the tubes without rupture of the tubes.

4. The method of claim 3 wherein the noncombustible gas is carbon dioxide.

5. The method of claim 3 wherein the combustible gas is oxygen mixed with hydrogen.

6. The method of claim 3 wherein the ends of the tubes are sealed in place by a resin bonded to the shell.

7. The method of claim 3 wherein the dialysis tubes are part of an artificial kidney with the dialysis tubes sealed in place by a resin bonded to the ends of the shell.

8. The method of claim 3 wherein the shell ends are cylindrical and are threaded and wherein the gas holding means is a correspondingly threaded cap provided with an opening for displacing noncombustible fluid from the gas holding means with a flow of the combustible gas.

9. The method of claim 3 wherein the shell ends are cylindrical amd wherein the gas holding means is a cap mounted adjacent to at least one shell end so as to provide an annular space between the cap and the end to provide an opening for displacing noncombustible fluid from the gas holding means with a flow of the combustible gas.

10. The method for cleaning and improving dialyzate fluid flow characteristics in a tubular dialysis unit of the type where multiple tube ends are sealed in place in a manner which provides sharp edged tube lips at end surfaces of the unit to be cleaned which comprises:

a. providing a noncombustible fluid inside the tubes; and
b. transiently providing a heated gas in contact with the lips without removing the noncombustible fluid from inside the tubes so as to round the lips and clean the flat surfaces of the unit without damaging the tubes.

11. The method of claim 10 wherein the heated gas is provided by a thermal energy release in a gas which is adjacent to the lips.

12. The method of claim 10 wherein the noncombustible fluid is a liquid.

* * * * *